US009331906B1

(12) United States Patent
McMullan et al.

(10) Patent No.: US 9,331,906 B1
(45) Date of Patent: \*May 3, 2016

(54) COMPARTMENTALIZATION OF THE USER NETWORK INTERFACE TO A DEVICE

(71) Applicant: Netronome Systems, Inc., Santa Clara, CA (US)

(72) Inventors: Jason Scott McMullan, Pittsburgh, PA (US); Trevor William Patrie, Pittsburgh, PA (US); Peter Liudmilov Djalaliev, Pittsburgh, PA (US); Roelof Nico Du Toit, Portersville, PA (US)

(73) Assignee: Netronome Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,057

(22) Filed: Nov. 23, 2014

Related U.S. Application Data

(63) Continuation of application No. 13/742,311, filed on Jan. 15, 2013, now Pat. No. 8,918,868.

(51) Int. Cl.
| | |
|---|---|
| *H04L 29/06* | (2006.01) |
| *H04L 12/24* | (2006.01) |
| *H04L 29/08* | (2006.01) |
| *G06F 9/455* | (2006.01) |
| *G06F 11/00* | (2006.01) |
| *G06F 12/14* | (2006.01) |
| *G06F 12/16* | (2006.01) |
| *G08B 23/00* | (2006.01) |

(52) U.S. Cl.
CPC ........ *H04L 41/0806* (2013.01); *G06F 9/45558* (2013.01); *H04L 63/0807* (2013.01); *H04L 67/025* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,601,226 B1 * | 12/2013 | Lappas et al. ................. | 711/162 |
| 2006/0123416 A1 * | 6/2006 | Cibrario Bertolotti et al. ... | 718/1 |
| 2009/0183173 A1 * | 7/2009 | Becker et al. ................. | 719/313 |
| 2009/0220090 A1 * | 9/2009 | Savagaonkar et al. ........ | 380/277 |
| 2009/0293057 A1 * | 11/2009 | Larkin et al. ...................... | 718/1 |
| 2010/0058335 A1 * | 3/2010 | Weber .............................. | 718/1 |
| 2010/0191784 A1 * | 7/2010 | Sobel et al. ................... | 707/823 |
| 2010/0223613 A1 * | 9/2010 | Schneider ......................... | 718/1 |
| 2010/0275038 A1 * | 10/2010 | Lin ................................. | 713/193 |
| 2012/0185914 A1 * | 7/2012 | Delco et al. ...................... | 726/1 |
| 2013/0067470 A1 * | 3/2013 | Chen et al. ....................... | 718/1 |

\* cited by examiner

*Primary Examiner* — Shin-Hon Chen
(74) *Attorney, Agent, or Firm* — Imperium Patent Works LLP; T. Lester Wallace; Mark D. Marrello

(57) ABSTRACT

A device has physical network interface port through which a user can monitor and configure the device. A backend process and a virtual machine (VM) execute on a host operating system (OS). A front end user interface process executes on the VM, and is therefore compartmentalized in the VM. There is no front end user interface executing on the host OS outside the VM. The only management access channel into the device is via a first communication path through the physical network interface port, to the VM, up the VM's stack, and to the front end process. If the backend process is to be instructed to take an action, then the front end process forwards an application layer instruction to the backend process via a second communication path. The instruction passes down the VM stack, across a virtual secure network link, up the host stack, and to the backend process.

20 Claims, 7 Drawing Sheets

COMPARTMENTALIZATION OF THE USER NETWORK INTERFACE TO A DEVICE

CROSS REFERENCE TO RELATED APPLICATION

This application is a continuation of, and claims priority under 35 U.S.C. §120 from, nonprovisional U.S. patent application Ser. No. 13/742,311 entitled "COMPARTMENTALIZATION OF THE USER NETWORK INTERFACE TO A DEVICE," filed on Jan. 15, 2013, and published as U.S. Pat. Pub. No. 2014/0201734. The disclosure of the foregoing document is incorporated herein by reference.

TECHNICAL FIELD

The described embodiments relate to the providing of secure user interfaces into devices (for example, into network appliances), and to related devices and methods.

BACKGROUND INFORMATION

A network appliance is often provided with a physical user interface port. A legitimate user can hook up to the port, and can configure and monitor operation of the network appliance through the port. Unfortunately, such a port can often also often be attacked and exploited by illegitimate users. Most attacks on such user interface ports are attacks on an application layer front end user interface process. Specially designed communications are sent to the front end user interface process through the provided user interface network port. These communications cause the front end process to crash or to become unstable in some way such that the user interface front end process is made to write a rogue file, where the file contains rogue executable code. The rogue executable code is then somehow made to be executed. There are many different ways to exploit different vulnerabilities so as to cause these actions to occur, but attacks generally involve causing a file of code to be written and then executed. Even though providing a user interface port presents exploitable vulnerabilities to hackers, it is nevertheless desired to provide such a port for use by legitimate users. Ways of securing the user interface port against attacks by illicit users are sought.

SUMMARY

A device (for example, a network appliance) has physical user interface network port through which a user can use a remote computing device to monitor and/or configure the device. A backend process and a virtual machine execute on a host operating system of the device. A front end user interface web server process executes on the virtual machine, and there is no front end user interface executing on the host operating system outside the virtual machine. The host operating system has set up the virtual machine so that the file system of the virtual machine is "read only". The virtual machine is confined to a first portion of memory, and the processes executing as application programs on the virtual machine cannot write files due to the file system of the virtual machine being read only. The host operating system and the backend process are resident in, and use, a second portion of memory other than the first portion of memory.

The only management access channel into the device is via a first communication path. The first communication path extends from the computing device used by the user, across an external network connection or connections (for example, the Internet and a LAN connection) to the physical network port of the device, into the device through the physical user interface network port, to a virtual NIC port of the virtual machine (without passing through the IP or TCP layers of the host stack), up the stack of the virtual machine, and to the front end user interface process executing as an application layer program on the virtual machine. Application layer messages can pass in either direction between the user's computing device and the front end user interface web server process via this first communication path. The user may use a web browser executing on the user's computing device to interact with the front end user interface web server process via this first communication path.

The backend process can be instructed to perform a desired action. For example, the backend process can be instructed to cause a particular configuration operation to be performed. If the backend process is to be instructed to take a configuration action, then the front end process forwards an appropriate "query" application layer instruction to the backend process via a second communication path. The second communication path extends from the front end user interface process in the virtual machine, down the stack of the virtual machine, out of a virtual NIC port of the virtual machine, across a virtual secure network link to a virtual NIC port of the host kernel, up the stack of the host operating system, and in the form of the "query" application layer message to the backend process. The backend process receives the query application layer message, interprets it as an instruction to perform the configuration operation, and causes the configuration operation to be carried out. After the configuration operation is confirmed to have been performed, the backend process communicates a confirmatory application layer "result" message back to the front end process via the second communication path. The front end process may in turn communicate a confirmatory application layer message to the user via the first communication path. The mechanism of the stacks of the virtual machine and the host operating system is used to realize the virtual secure network link between the kernel of the virtual machine and the kernel of the host operating system. Ethernet frames are communicated across the virtual secure network link just as if the network link were a link across a wired connection between network devices. The Ethernet frames communicated across the virtual secure network link carry IP payloads, and these IP payloads are encrypted in accordance with the IPSec protocol. Messaging across the virtual secure network link is authenticated.

The front end user interface process is compartmentalized in the virtual machine. There is no front end user interface process executing as an application layer program on the host operating system (outside the virtual machine) for a hacker to attack through the physical user interface network port. Moreover, the front end user interface process that is executing on virtual machine cannot cause a file to be written because the file system of the virtual machine was set up by the host operating system to be a "read only" file system. The virtual machine is confined to operate in the first portion of memory such that under no circumstances can the virtual machine write data outside this first portion of memory into the second portion of memory, or write files to host file system, where rogue code could be executed on the host operating system. If the front end user interface process were to become corrupted, then the host operating system can shut down the virtual machine and terminate its operation, thereby effectively wiping the first portion of memory clean. The host operating system can then instantiate another virtual machine having a fresh copy of the front end user interface process, and operation of the network appliance can continue.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
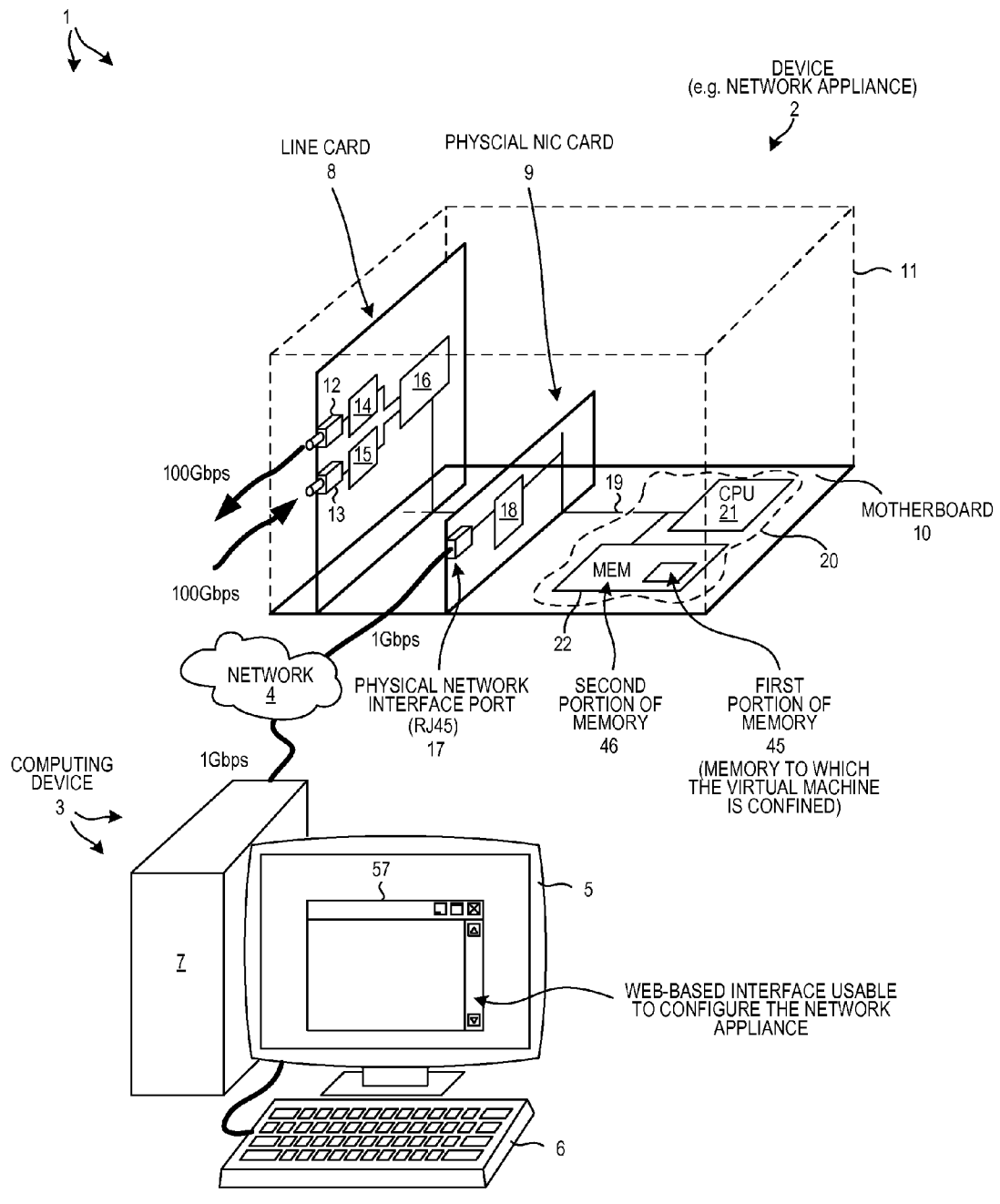
FIG. 1 is a diagram of a system 1 that includes a device 2 (for example, a network appliance) in accordance with one novel aspect.

FIG. 1 is a diagram of a system 1 that includes a device 2 and a computing device 3. The device 2 in this case is a network appliance. A user can use the computing device 3 to interact with and to communicate with the network appliance via a network or networks 4. The computing device 3 in this example is a computer, such as a typical Personal Computer (PC), that includes a display 5, a keyboard 6, and a tower 7. The network appliance 2 in this example includes a line card 8, a NIC (Network Interface Card) expansion card 9, and a motherboard 10 that are disposed within an enclosure 11. The line card 8 and the NIC card 9 plug into card edge connectors (not shown) on the motherboard 10. The line card 8 includes a number of optical transceivers 12 and 13 (two of which are shown) for engaging in high speed 100 Gbps network communications across optical fibers, and other circuitry 14-16 which includes a network flow processor integrated circuit 16. The NIC card 9 includes a physical network interface port 17 and other circuitry 18. In this example, physical network interface port 17 is a RJ45 jack or socket for receiving an RJ45 plug. The motherboard 10 includes backplane PCI bus connectors 19, and host circuitry 20. The physical NIC 9 and the line card 8 are set up as PCI devices on the PCI bus, where the root of the PCI bus is on the host. Host circuitry 20 includes a CPU 21 and an amount of memory 22, as well as many other parts (not illustrated). CPU 21 is a processor, whereas memory 22 is a processor-readable medium that is readable by the processor.

Figure 2:
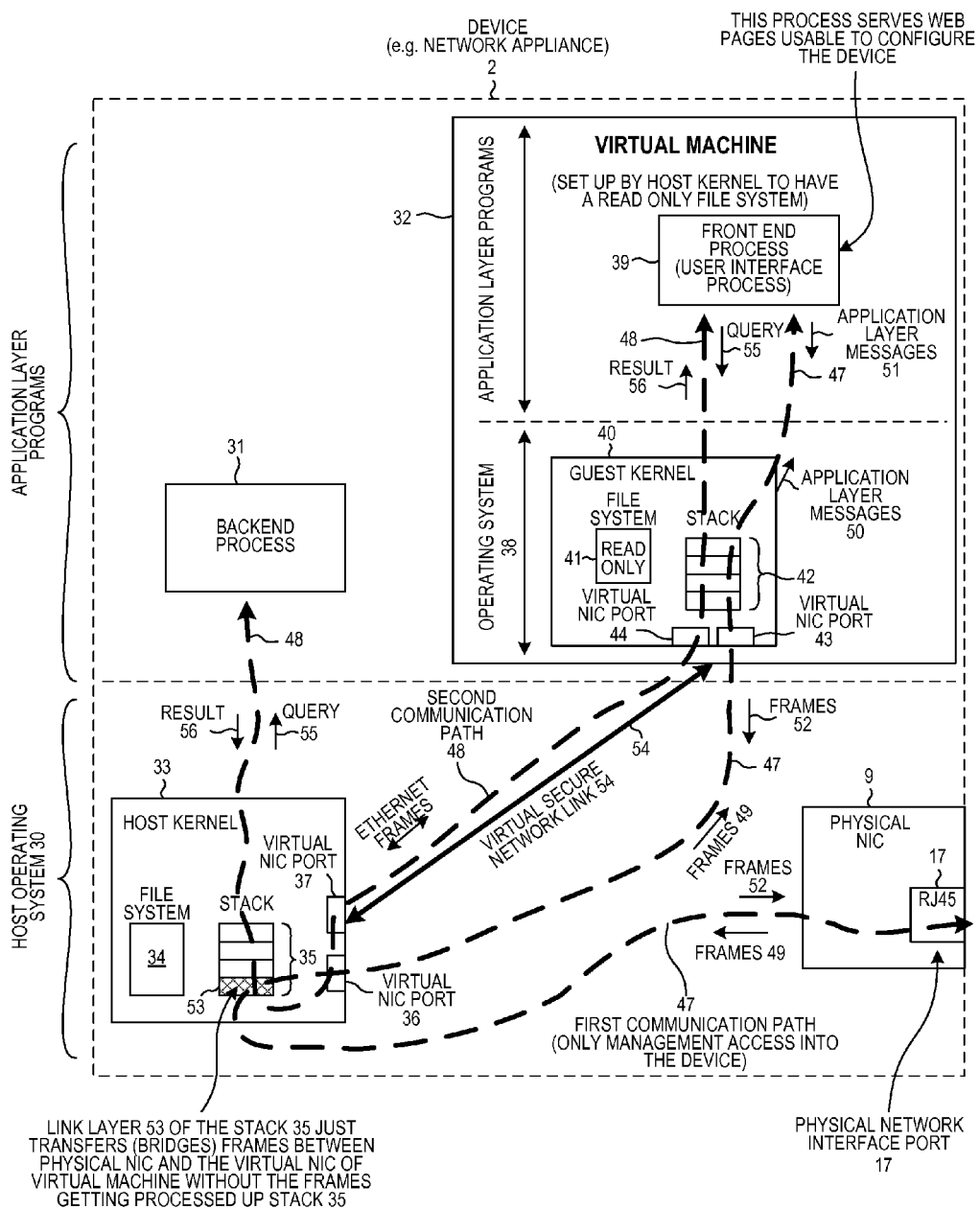
FIG. 2 is a diagram that illustrates software organization of a first embodiment of the device 2 of FIG. 1.

FIG. 2 is a diagram that illustrates software organization of a first embodiment of the device 2 of FIG. 1. The software illustrated in FIG. 2 executes on the CPU 21 of FIG. 1. The software includes a host operating system 30 and application layer programs 31 and 32. The application programs 31 and 32 execute on the host operating system 20. Host operating system 20 includes a host kernel 23. The host kernel 33 of the host operating system in turn includes a file system 34, a network stack 35 of protocol processing layers, a first virtual NIC port 36, a second virtual NIC port 37, and other software components such as a driver (not shown) for interfacing with the physical NIC card 9. Virtual machine 32 includes an operating system 38 and an application layer program 39 that executes on the operating system 38. The application layer program 39 is a front end user interface web server program. A user uses a browser executing on a remote computer, such as on computing device 3 of FIG. 1, to interact with the network appliance via a web-based user-interface portal provided by the front end web server process 39. A web page 57 served by the web-based user interface front end process 39 is displayed shown in FIG. 1 being displayed on display 5. The operating system 38 of the virtual machine includes a guest kernel 40. The guest kernel 40 in turn includes a file system 41, a network stack 42 of protocol processing layers, a first virtual NIC port 43, and a second virtual NIC port 44. The virtual machine 32 is set up by the host operating system 30 so that the virtual machine 32 can only occupy a certain allotted first portion 45 of memory. This first portion 45 of memory is illustrated schematically in FIG. 1. The remainder of the software, namely the host operating system 30 and the backend process 31, are resident in a second portion 46 of memory. The second portion 46 of memory is illustrated schematically in FIG. 1. In addition, the virtual machine 32 is set up by the host operating system 30 such that the file system 41 of the virtual machine is read only. Processes executing on the virtual machine may write data (for example, variables to be updated during operation of the process), but the process cannot write a file due to the fact that the host operating system did not give the virtual machine 32 permission to write files.

The backend process 31 supplies configuration information and instructions to the line card 8. For example, the backend process 31 can cause the line card 8 to be configured so that the line card intercepts packets of a particular flow, decrypts SSL records of that flow, and then forwards the decrypted contents of the records to another device (not shown) via another network (not shown) connection between the other device and the network appliance. The packets of other flows may, however, not be decrypted and not forwarded for copying but rather merely pass through the line card 8. The backend processor 31 configures the line card to intercept and decrypt the flow in part by supplying the line card a so-called 5-tuple (source TCP port, destination TCP port, source IP address, destination IP address, and application layer protocol) that identifies the flow along with a command to intercept and decrypt and forward packets of the indicated flow.

Figure 3:
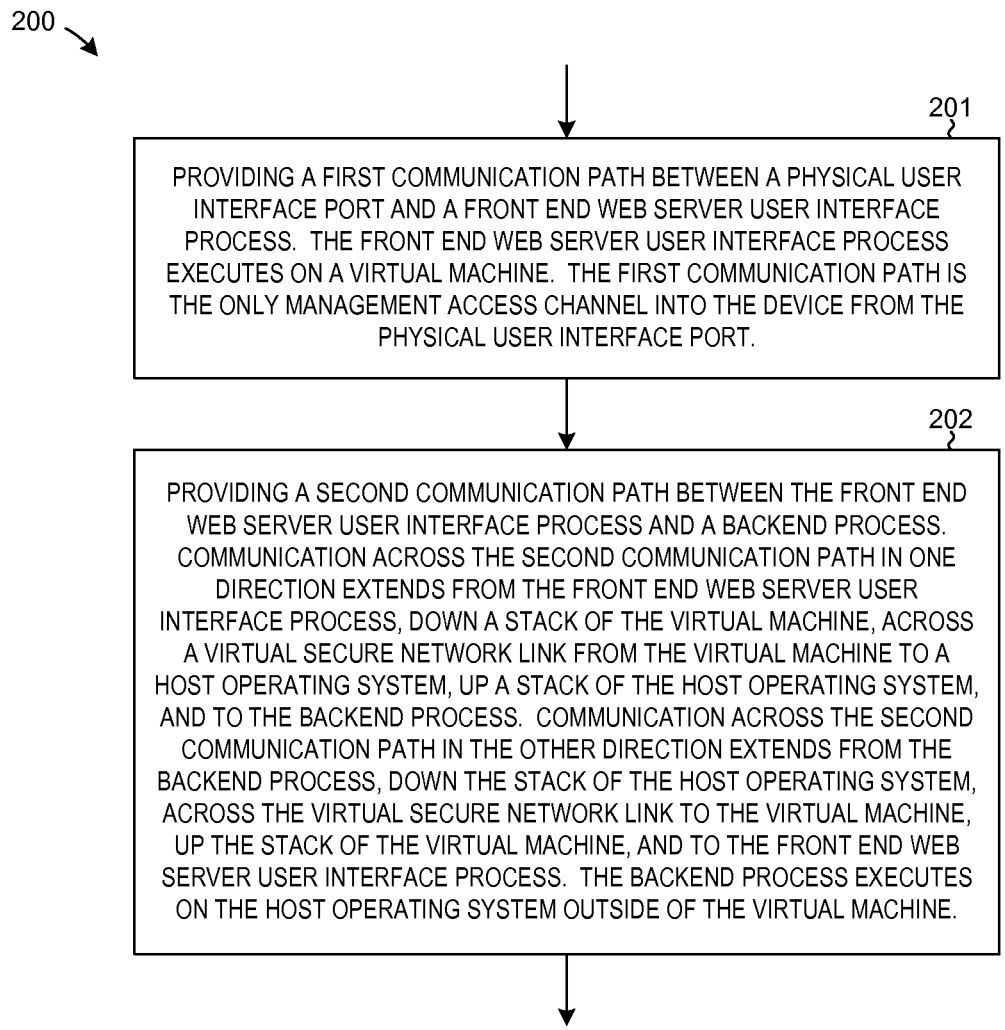
FIG. 3 is a flowchart of a first method 200 in accordance with a first novel aspect.
Figure 4A:
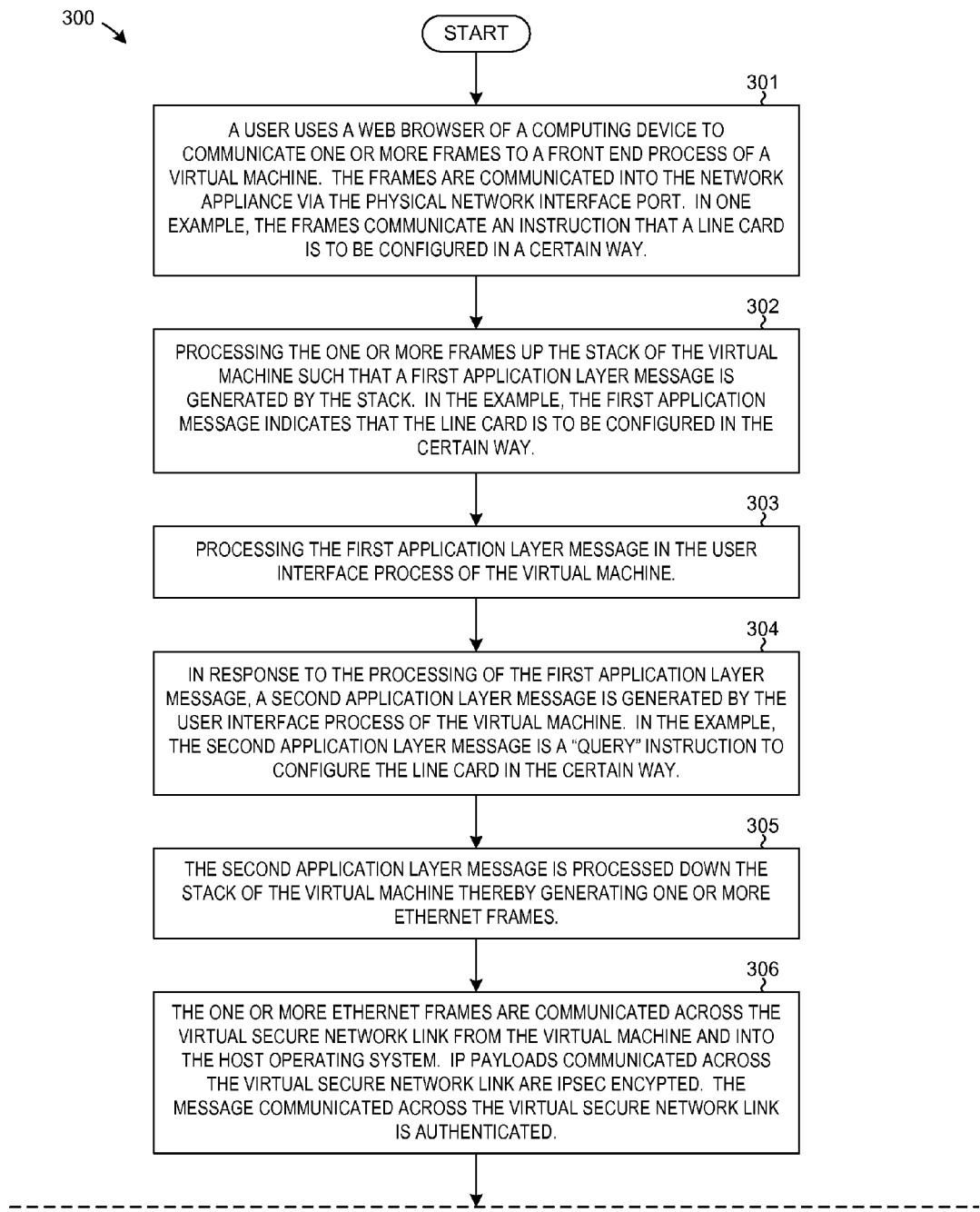
FIG. 4A is a flowchart illustrating steps 301-306 of a second method 300 in accordance with a second novel aspect.
Figure 4B:
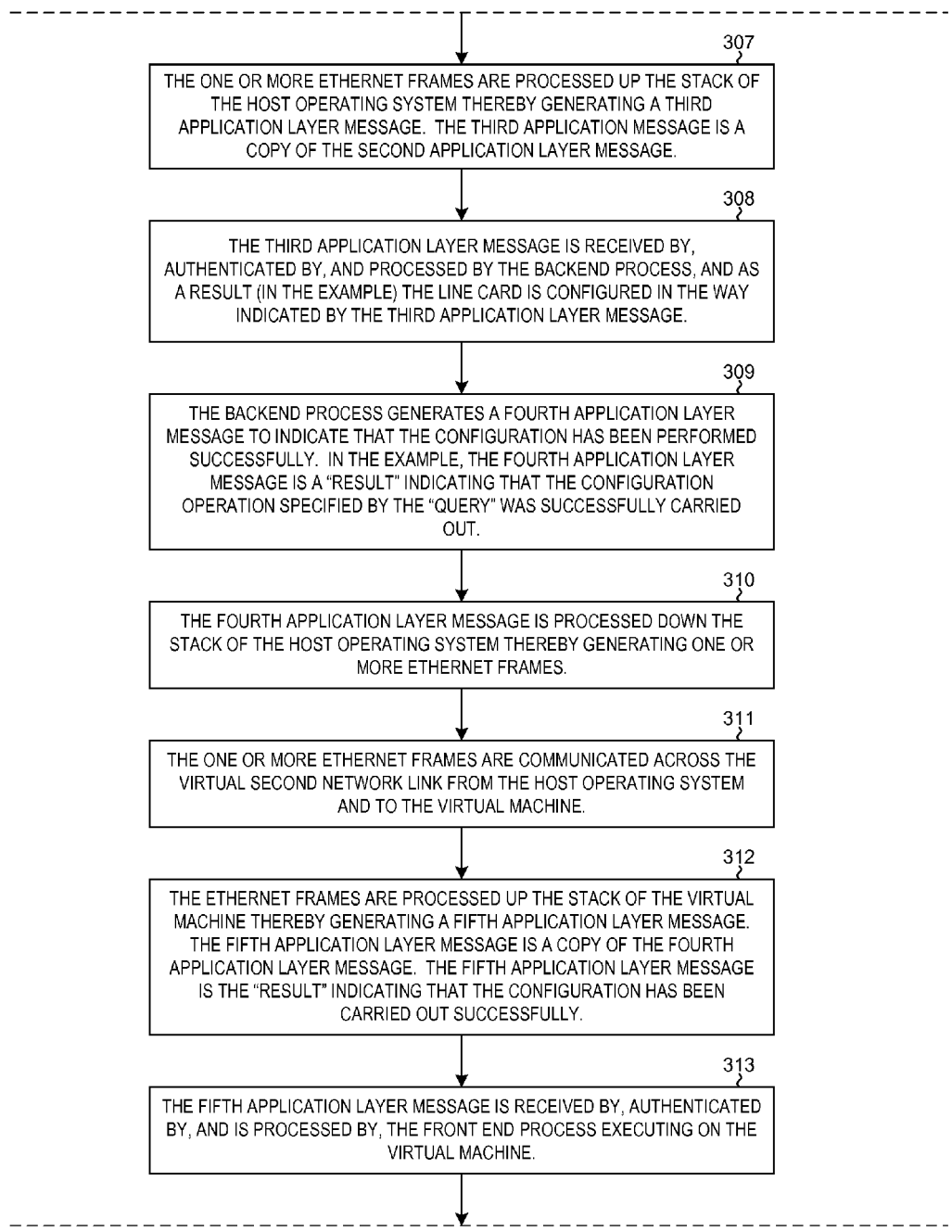
FIG. 4B is a flowchart illustrating steps 307-313 of a second method 300 in accordance with a second novel aspect.
Figure 4C:
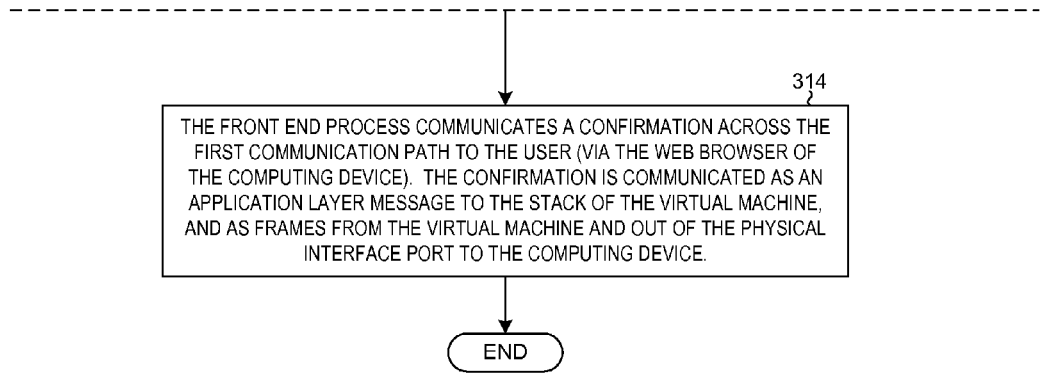
FIG. 4C is a flowchart illustrating step 314 of a second method 300 in accordance with a second novel aspect
Figure 4C:
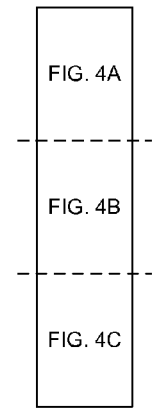

FIG. 3 illustrates a method 200 involving a first step 201 of providing a first communication path 47 and a second step 202 of providing a second communication path 48. The providing steps 201 and 202 are carried out by device 2.

The first communication path 47 is a path between the physical network interface port 17 and the web server user interface front end process 39. In the example illustrated in FIG. 2, information passes from the remote computing device 3 and to the front end user interface process 39 via the first communication path 47 passes from physical user interface port 17, through the physical NIC card 9, to the bottom link layer 53 of the stack 35 of the host kernel 33, through the stack 35 without passing through the TCP layer of the stack, out of the host kernel 33 via virtual NIC port 36, into the first portion 45 of memory allocated to the virtual machine via the virtual NIC port 43, up through the stack 42 of the guest kernel 40 of the virtual machine, and to the front end user interface process 39. The information passes in the form of network Ethernet frames 49 from physical network port 17 and to host kernel 33. The frames are DMA transferred, by a DMA controller on the physical NIC card 9, from a memory on the physical NIC card 9, across bus conductors 19 on the motherboard 10, and into the memory 22 used by the host kernel 33. The frames pass through the link layer 53 of the host kernel 33, and out of virtual NIC port 36, and on to the virtual machine 32. Each frame is moved from the second portion 46 of the memory 22 (controlled by the host operating system) and into the first portion 45 of the memory 22 (controlled by the virtual machine), complete as an Ethernet frame having an Ethernet header. Once in the virtual machine, the frames 49 are processed by stack 42 of the virtual machine so that application layer messages 50 are formed. Thereafter the information passes in the form of these application layer messages 50 from stack 42 to front end process 39. Information passing in the other direction passes in the form of application layer messages 51 from the front end process 39 to the top layer of stack 42. The resulting frames 52 pass from stack 42, out of the first portion 45 of memory space of the virtual machine via virtual NIC port 43. The frames 52 pass into the second portion 46 of memory of host kernel 33 via virtual NIC port 36, and from the host kernel 33 to the physical NIC card 9, and to physical network port 17. The link layer 53 of the stack 35 just transfers (bridges) frames between the physical NIC card 9 and the virtual machine 32 without regenerating IP packets or TCP segments, and without performing any IP or TCP layer protocol processing. When it is performing this function, the link layer 53 is sometimes referred to as an Ethernet bridge. The stack 42 of the virtual machine 32 is configured so that only frames that are communicated to, or that originate from, a particular TCP port will be processed. For incoming communications, this TCP port is a TCP port identified with the front end process 39. All other incoming frames are ignored. First communication path 47 between physical network port 17 and front end process 39 is the only legitimate management access channel into the network appliance 2 from the physical network interface port 17.

The second communication path 48 is a path between the front end user interface process 39 and the backend process 31. Information passing from the front end process 39 to the backend process 31 is communicated in the form of application layer messages from the front end process 39 to the stack 42 of the guest kernel 40 of the virtual machine. From there, the application layer messages are processed down the stack 42 of the guest kernel 40 of the virtual machine. The resulting Ethernet frames are communicated out of the first portion 45 of memory space via virtual NIC port 44. The Ethernet frames are communicated across virtual second network link 54, and through virtual NIC port 37, to the stack 35 of the host kernel 33. The Ethernet frames are processed up the stack 35 of the host kernel, and the resulting application layer messages are communicated from the stack 35 to the backend process 31.

Information passing in the opposite direction from the backend process 31 to the front end process 39 passes in the form of application layer messages from the backend process 31 to the stack 35 of the host kernel 33. The application layer messages are processed down to the stack 35, and the resulting Ethernet frames are communicated to the virtual machine via virtual NIC port 37, across virtual secure network link 54, and virtual NIC port 44. The frames are processed up the stack 42 of the guest kernel 40 of the virtual machine. The resulting application layer messages are communicated from stack 42 to the front end process 39. In one example, an application layer message communicated from the front end process 39 across this second communication path 48 to the backend process 31 is a message 55 called a "query". The query 55 is an instruction understood by the backend process 31 to be an instruction to configure the line card 8 in a certain way. The query application layer message has the same form as it leaves the front end process 39 as it has when it is received by the backend process 31. Backend process 31 authenticates an incoming "query" using an authentication ticket issued for authentication purposes. An application layer message communicated from the backend process 31 to the front end process 39 via this second communication path 48 is a message 56 called a "result". The result 56 is a response that indicates that the query was successfully completed. The result application layer message has the same form as it leaves the backend process 39 as it has when it is received by the front end process 39. The front end process authenticates the "result" using an authentication ticket. A ticket-based authentication protocol (Kerberos) is employed to ensure that all "query" and "result" messages originate from authenticated sources. The established and understood mechanism of stacks 35 and 42, of virtual NIC ports 44 and 37, and of link 54 is used to communicate application layer query and result messages back and forth in a secure and reliable fashion between front end process 39 and backend process 31. The IP payloads carried in the Ethernet frames that are communicated across the virtual secure network link 54 are encrypted in accordance with the IPSec protocol suite. High-level messaging (for example, "query" and "result" messaging) across the virtual secure network link is authenticated using Kerberos as described above. Accordingly, traffic across the virtual secure network link is protected against packet sniffing and replay attacks. Sensitive information (such as passwords and encryption keys and sensitive data) is not used by or stored in the front end process, so even if an attacker were able to defeat the process jail and to defeat system permissions, the attacker would still not be able to access the sensitive information because the sensitive information is not stored anywhere in first portion 45 of memory. The sensitive information is only available via authenticated "query" messages to the backend process 31.

FIG. 4 is a flowchart of a method 300 in accordance with one novel aspect. A user uses a web browser (step 301) executing on a computing device to communicate with a front end user interface web server process of a virtual machine in a network appliance. The communication may be an HTML communication carried by frames, where the frames are communicated via a first communication path into the network appliance via a physical network interface port of the network appliance. In one example, the physical user interface network port is a physical port provided only for managing and configuring the network appliance. In this example, the first communication path is the path 47 of FIG. 2. The frames do not pass through the IP and TCP protocol processing layers of the stack of the host operating system. The frames communicate an instruction that a particular line card of the network appliance is to be configured in a certain way.

The one or more frames are processed (step 302) up a stack of the virtual machine thereby generating a first application layer message. The first application layer message indicates that the line card is to be configured in the certain way. No frames received onto the network appliance via the physical network interface port are processed in any transport layer of any stack executing on the network appliance, other than in the transport layer of the stack of the virtual machine.

The first application layer message is received by the user interface process of the virtual machine, and is processed (step 303) by the front end user interface process executing in the virtual machine.

In response to the processing of the first application layer message, the front end user interface process generates (step 304) a second application layer message. The second application layer message is a "query" instruction that the line card be configured in the certain way.

The second application layer message is communicated via a second communication path from the front end user interface process executing on the virtual machine to a backend process executing on the host operating system of the network appliance. In one example, the second communication path is path 48 of FIG. 2. The second application layer message is processed down the stack of the virtual machine thereby generating (step 305) one or more Ethernet frames.

The one or more Ethernet frames that carry the second application layer message are communicated (step 306) across a virtual secure network link from the stack of the virtual machine and to the stack of the host operating system. IP payloads communicated across this virtual secure network link are IPSec encrypted. The frames communicated are communicated complete with their Ethernet headers, just as if the virtual secure network link were a real network physical link across a physical metal conductor between network devices.

The one or more Ethernet frames received from the virtual network second link are processed up the stack of the host operating system, thereby generating (step 307) a third application layer message. The third application layer message is a copy of the second application layer message (the "query").

The third application layer message is received by, is authenticated by, and is processed by (step 308), the backend process. The message is authenticated using a ticket-based authentication protocol. In response to the processing of the third application layer message, the backend process communicates with the line card, and as a result the line card is configured in the way indicated by the third application layer message.

When the configuration of the line card is confirmed to have been completed successfully, the backend process generates (step 309) a fourth application layer message. The fourth application layer message is a "result" message indicating that the configuration specified by the "query" was successfully carried out. This fourth application layer message is then communicated back across the second communication path to the front end process executing on the virtual machine.

The fourth application layer message is processed (step 310) down the stack of the host operating system, thereby generating one or more Ethernet frames.

The one or more Ethernet frames are communicated (step 311) across the virtual second network link from the host operating system and to the virtual machine.

The Ethernet frames are processed (step 312) up the stack of the virtual machine, thereby generating a fifth application layer message. The fifth application layer message is a copy of the fourth application layer message (the "result" indicating that the configuration has been successfully carried out).

The fifth application layer message is received by, is authenticated by, and is processed (step 313) by, the front end process executing on the virtual machine.

In response, the front end process of the virtual machine communicates (step 314) a confirmation across the first communication path and out of the physical network port to the computing device of the user. The communication may be an HTML communication that is rendered by the web browser executing on the user's computing device. The user of the browser sees the HTML rendered in the form of a web page on the display of the computing device. This constitutes visual confirmation to the user that the configuration of the line card was successfully carried out.

Conventional network appliances can often be attacked through their physical user interface ports. Such physical ports are often provided so that the network appliance can be configured by a network operator or other legitimate user. Most attacks on network appliances like this are attacks on an application layer front end process. Specially designed communications are sent into the network appliance and to the front end process through the user interface network port. These communications cause the front end process to crash or to become unstable in some way such that the user interface front end process is made to write a rogue file, where the file contains rogue executable code. The rogue executable code in the rogue file is then somehow made to be executed. There are many different ways to exploit different vulnerabilities so as to cause these actions to occur, but the majority of attacks involve causing a file of rogue code to be written and then executed. The network appliance of FIGS. 1-4 may not be immune to all attacks, but the network appliance 1 of FIGS. 1-4 has no front end user interface process (that receives frames from the physical network interface port 17) executing on the host operating system outside of the virtual machine 32. There is no such front end user interface process executing on the host to attack. Moreover, the front end user interface process 39 that is executing on the virtual machine 32 cannot cause a file to be written because the file system 41 of the virtual machine 32 was set up by the host operating system 30 to be a "read only" file system. Furthermore, the virtual machine 32 is confined to operate in the first portion 45 of memory 22. Under no circumstances can the virtual machine write a file outside this first portion 45 of memory. If the front end user interface process were to become corrupted, then the host operating system would shut down the virtual machine 32 and terminate its operation, thereby effectively wiping clean the first portion 45 of memory. The host operating system would then instantiate another virtual machine having a fresh copy of the front end user interface process, and operation of the network appliance would continue.

Although the network appliance of FIGS. 1-4 protects against attacks in which an attacker compromises a front end web server process so that the attacker can get the process to execute attacker-provided, malignant code, the novel user interface process compartmentalization described above in connection with the device 2 of FIGS. 1-4 also protects against more general attacks. By limiting the amount of code that handles traffic coming in from the physical network port 17, the amount of code that can be exploited and attacked is limited. The novel compartmentalization of the user interface process as described above is not limited to use in network appliances, but rather is generally applicable to any type of device that has a physical user interface port where operation of the device is not be compromised by attacks occurring through the physical user interface port. The device 2 may, for example, be an ATM (Automatic Teller Machine).

The mechanism to provide the secure nature of virtual secure network link 54 need not involve an IPSec tunnel. The use of IPSec in the example of FIGS. 1-4 is just one option for securing messages exchanged between the front end process 39 and the backend process 31. Security can be provided at the link-layer level, and also at the transport level (e.g. SSL/TLS) and also at the application layer (e.g. proprietary protocol for message integrity and confidentiality). In some embodiments, link 54 is a virtual network link but it is not particularly secure. Even without the virtual network link of the second communication path being a high security link, the compartmentalization of the user interface process in a virtual machine that only has a read only file system provides substantial immunity to attack through the physical network interface port 17.

Figure 5:
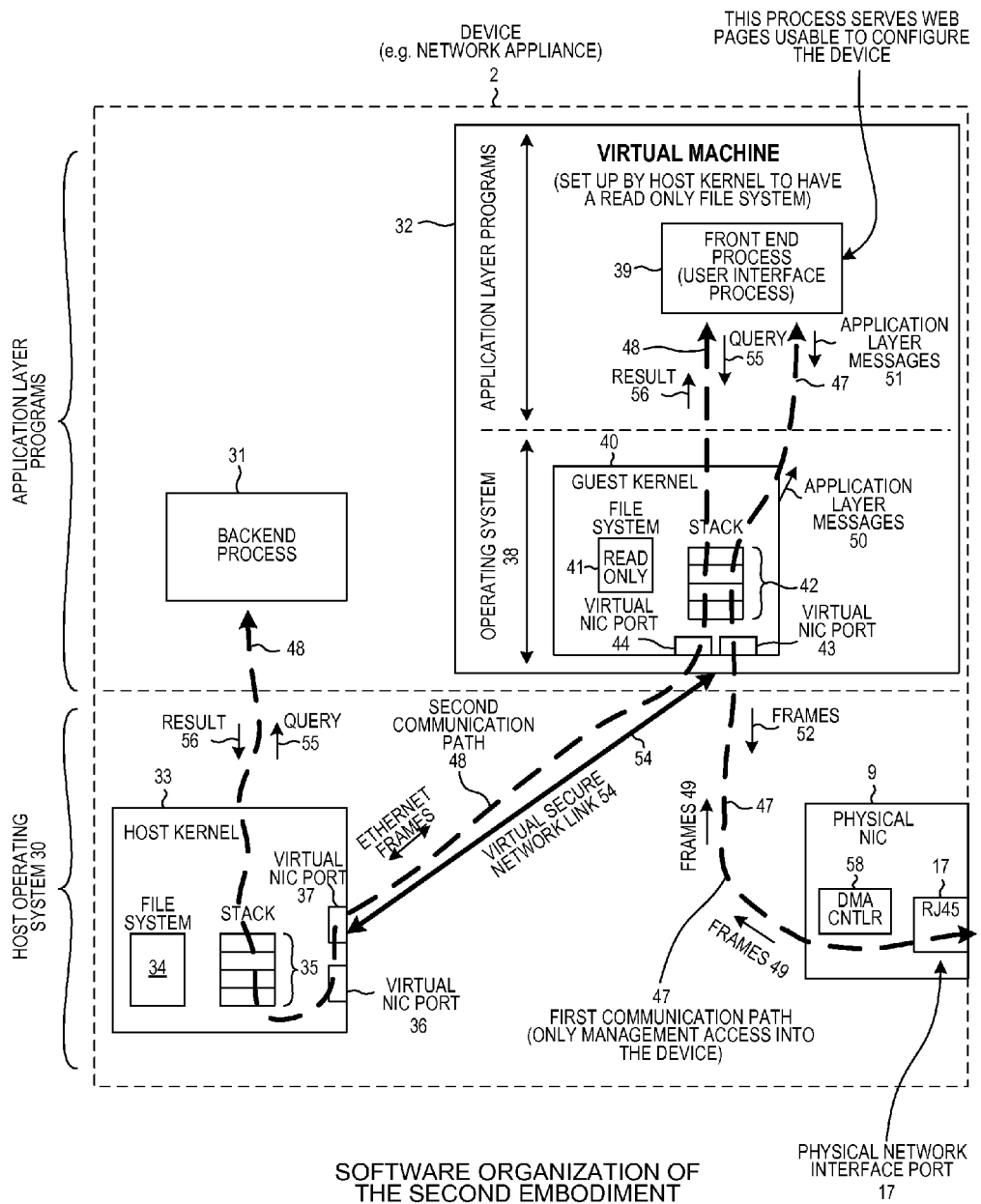
FIG. 5 is a diagram that illustrates software organization of a second embodiment of the device 2 of FIG. 1.

FIG. 5 is a diagram of a second embodiment of the device 2 of FIG. 1. In this embodiment, the first communication path 47 is a direct path between physical NIC 9 and virtual machine 32. The first communication path 47 does not pass through any layer of host stack 35, nor does it pass through the second portion 46 of memory. This implementation is possible on CPUs which support a technology known as DMA remapping. DMA mapping allows the host kernel to configure a virtual machine such that a physical NIC is directly mapped to the guest kernel of the virtual machine. After being set up in this way, a DMA controller on the physical NIC can DMA-transfer frames directly from memory on the physical NIC into the portion of memory allotted to the virtual machine, thereby bypassing the host kernel and bypassing the portion of memory used by the host operating system. In the embodiment illustrated in FIG. 5, information passes from remote computing device 3 and to the front end user interface process 39 via the first communication path 47. The first communication path 47 extends into physical network interface port 17, from the physical NIC card 9 across PCI bus conductors 19 directly into the first portion 45 of memory 22, up through the stack 42 of the guest kernel 40 of the virtual machine 32, and to the front end user interface process 39. The information passes in the form of network Ethernet frames 49 between physical network interface port 17 and guest kernel 40. The frames are DMA-transferred, by a DMA controller 58 on the physical NIC card 9, from a memory on the physical NIC card 9, across PCI bus conductors 19 on the motherboard 10, and directly into the first portion 45 (allocated to and controlled by the virtual machine) of memory 22. Once in the virtual machine 32, the frames 49 are processed by stack 42 of the virtual machine so that application layer messages 50 are formed. Thereafter the information passes in the form of these application layer messages 50 from stack 42 to front end process 39. Information passing in the other direction passes in the form of application layer messages 51 from the front end process 39 to the top layer of stack 42. The resulting frames 52 are DMA-transferred by DMA controller 58 out of the first portion 45 of memory space of the virtual machine and across the PCI bus 19 to the physical NIC card 9, and to physical network interface port 17. None of the frames ever passes through the second portion 46 of memory 22. The stack 42 of the virtual machine 32 is configured so that only frames that are communicated to, or that originate from, a particular TCP port will be processed. For incoming communications, this TCP port is a TCP port identified with the front end process 39. All other incoming frames are ignored. First communication path 47 between physical network port 17 and front end process 39 is the only legitimate management access channel into the device 2 from the physical interface port 17.

Although the present invention has been described in connection with certain specific embodiments for instructional purposes, the present invention is not limited thereto. The compartmentalization of a front end user interface process in a virtual machine having a read only file system, where communication between the front end process and a back process is via a virtual secure network link, is not limited to use in network appliances but rather applies generally to any electronic device that has a physical network user interface port that should be available to legitimate users of the device but that also should also be substantially immune to attacks through the physical network interface port. Processes described above as being carried out in software can be implemented to be carried out by specialized hardware if desired. Accordingly, various modifications, adaptations, and combinations of various features of the described embodiments can be practiced without departing from the scope of the invention as set forth in the claims.

What is claimed is:

1. A method of configuring a network appliance, wherein a host operating system, a virtual machine, and a backend process execute on the network appliance, wherein the network appliance includes a physical network interface port, wherein the virtual machine and the backend process are application layer programs executing on the host operating system, wherein the host operating system includes a stack, and wherein the virtual machine includes a stack and a user interface process, the method comprising:
 (a) communicating one or more frames from the physical network interface port of the network appliance to the virtual machine;
 (b) processing the one or more frames in the stack of the virtual machine such that a first application layer message is generated by the stack;
 (c) processing the first application layer message in the user interface process of the virtual machine thereby generating a second application layer message;
 (d) processing the second application layer message in the stack of the virtual machine thereby generating one or more Ethernet frames;
 (e) communicating the one or more Ethernet frames from the virtual machine via a virtual secure network link and to the host operating system;
 (f) processing the one or more Ethernet frames in the stack of the host operating system thereby generating a third application layer message;
 (g) processing the third application layer message in the backend process; and
 (h) as a result of the processing of the third application layer message the backend process causes a part of the network appliance to be configured.

2. The method of claim 1, wherein the user interface process serves web pages.

3. The method of claim 1, wherein the third application layer message includes an instruction for the backend process to initiate a configuration operation.

4. The method of claim 1, further comprising:
 (i) employing a ticket-based authentication protocol to ensure that the third application layer message originates from an authenticated source.

5. The method of claim 1, wherein the part of the network appliance is a line card.

6. The method of claim 1, wherein the third application layer message causes the line card to be configured so that the line card intercepts packets of a particular flow, decrypts SSL records of that flow, and then forwards the decrypted contents of the records to a device external to the network appliance.

7. The method of claim 1, further comprising:
 (i) outputting a confirmation message from the network appliance, wherein the confirmation message indicates that the configuration of the part of the network appliance has been successfully carried out.

8. The method of claim 1, further comprising:
 (i) outputting an HTML (HyperText Markup Language) confirmation message from the network appliance, wherein the HTML confirmation message indicates that the configuration of the part of the network appliance has been successfully carried out.

9. The method of claim 1, wherein there is no user interface process executing on the host operating system.

10. The method of claim 1, wherein the one or more Ethernet frames of (e) have IP payloads, and wherein these IP payloads are encrypted.

11. The method of claim 1, wherein the one or more Ethernet frames of (e) have IP payloads, and wherein these IP payloads are IPSec encrypted.

12. The method of claim 1, wherein none of the frames communicated in (b) is processed in any TCP (Transmission Control Protocol) layer of the stack of the host operating system, and wherein none of the frames communicated in (b) is processed in any IP (Internet Protocol) layer of the stack of the host operating system.

13. A method of configuring a device, wherein a host operating system, a virtual machine, and a backend process execute on the device, wherein the device includes a physical network interface port, wherein the virtual machine and the backend process are application layer programs executing on the host operating system, wherein the host operating system includes a host kernel and a stack, and wherein the virtual machine includes a stack and a user interface process, the method comprising:

(a) communicating one or more first frames from the physical network interface port of the device to the virtual machine;

(b) processing the one or more first frames in the stack of the virtual machine such that a first message is generated by the stack;

(c) processing the first message in the user interface process of the virtual machine thereby generating a second message;

(d) processing the second message in the stack of the virtual machine thereby generating one or more second frames;

(e) communicating the one or more second frames from the virtual machine via a virtual secure network link and to the host operating system;

(f) processing the one or more second frames in the stack of the host operating system thereby generating a third message;

(g) processing the third message in the backend process; and (h) as a result of the processing of the third message the backend process causes a part of the device to be configured.

14. The method of claim 13, wherein the third message is a query message, the method further comprising:

(i) communicating a fourth message from the backend process via the host operating system to the user interface process, wherein the fourth message is a result message.

15. The method of claim 14, wherein the back end process employs a ticket-based authentication protocol to authenticate the third message, and wherein the user interface process employs the ticket-based authentication protocol to authenticate the fourth message.

16. The method of claim 13, wherein the device is an ATM (Automatic Teller Machine).

17. The method of claim 13, wherein none of the frames communicated in (a) is processed in any TCP (Transmission Control Protocol) layer of the stack of the host operating system, and wherein none of the frames communicated in (a) is processed in any IP (Internet Protocol) layer of the stack of the host operating system.

18. The method of claim 13, wherein the one or more first frames communicated in (a) are communicated from the physical network interface port of the device to the virtual machine via the host kernel.

19. The method of claim 13, wherein the one or more first frames communicated in (a) are communicated from the physical network interface port of the device to the virtual machine via the host kernel.

20. The method of claim 13, wherein the one or more first frames communicated in (a) are communicated from the physical network interface port of the device to the virtual machine without passing through the host kernel.

* * * * *